(12) United States Patent
Lucas et al.

(10) Patent No.: US 8,645,256 B1
(45) Date of Patent: Feb. 4, 2014

(54) TRANSFORMATION WEIGHTED INDEXES OFFERING CONCENTRATED MULTI-RISK FACTOR EXPOSURE

(71) Applicant: Lucas Mendoza Intellectual Property, Inc., La Jolla, CA (US)

(72) Inventors: Ian Lucas, La Jolla, CA (US); Christopher Mendoza, San Diego, CA (US)

(73) Assignee: Lucas Mendoza Intellectual Property, Inc., La Jolla, CA (US)

( * ) Notice: Subject to any disclaimer, the term of this patent is extended or adjusted under 35 U.S.C. 154(b) by 0 days.

(21) Appl. No.: 13/757,197

(22) Filed: Feb. 1, 2013

Related U.S. Application Data

(60) Provisional application No. 61/695,919, filed on Aug. 31, 2012.

(51) Int. Cl.
*G06Q 40/00* (2012.01)
(52) U.S. Cl.
USPC .......................................................... 705/36 R
(58) Field of Classification Search
USPC .......................................... 705/35–45, 36 R
See application file for complete search history.

(56) References Cited

U.S. PATENT DOCUMENTS

| | | | | | |
|---|---|---|---|---|---|
| 5,819,238 | A * | 10/1998 | Fernholz | | 705/36 R |
| 6,061,663 | A * | 5/2000 | Bloom et al. | | 705/36 R |
| 7,587,352 | B2 * | 9/2009 | Arnott | | 705/36 T |
| 7,620,577 | B2 * | 11/2009 | Arnott et al. | | 705/35 |
| 7,739,178 | B2 * | 6/2010 | Umlauf | | 705/36 R |
| 7,747,502 | B2 * | 6/2010 | Arnott et al. | | 705/36 R |
| 7,792,719 | B2 * | 9/2010 | Arnott | | 705/35 |
| 7,818,241 | B2 * | 10/2010 | Ho et al. | | 705/36 R |
| 7,958,038 | B2 * | 6/2011 | Choueifaty | | 705/36 R |
| 8,005,740 | B2 * | 8/2011 | Arnott et al. | | 705/36 R |
| 8,131,620 | B1 * | 3/2012 | Steinberg et al. | | 705/36 R |
| 8,239,306 | B2 * | 8/2012 | Sauter et al. | | 705/36 R |
| 8,306,892 | B1 * | 11/2012 | Gross et al. | | 705/36 R |
| 8,374,937 | B2 * | 2/2013 | Arnott et al. | | 705/36 R |
| 8,374,939 | B2 * | 2/2013 | Arnott et al. | | 705/36 R |
| 8,374,951 | B2 * | 2/2013 | Arnott et al. | | 705/37 |
| 8,380,604 | B2 * | 2/2013 | Arnott et al. | | 705/36 R |
| 8,515,851 | B2 * | 8/2013 | Cardoza et al. | | 705/36 R |
| 8,548,884 | B2 * | 10/2013 | Meucci | | 705/35 |
| 2003/0065600 | A1 * | 4/2003 | Terashima et al. | | 705/36 |
| 2004/0181477 | A1 * | 9/2004 | Sauter et al. | | 705/36 |
| 2005/0149422 | A1 * | 7/2005 | Van Lier | | 705/36 |
| 2005/0171884 | A1 * | 8/2005 | Arnott | | 705/36 |
| 2006/0015433 | A1 * | 1/2006 | Arnott et al. | | 705/35 |
| 2006/0149645 | A1 * | 7/2006 | Wood | | 705/35 |
| 2006/0247996 | A1 * | 11/2006 | Feldman | | 705/35 |
| 2006/0253363 | A1 * | 11/2006 | Tarrant | | 705/35 |

(Continued)

OTHER PUBLICATIONS

Jones, Robert. C, "Earnings basis for weighting stock portfolios", Pension&Investments, Aug. 6, 1990, pp. 1-2.*

(Continued)

*Primary Examiner* — Mohammad Z Shaikh
(74) *Attorney, Agent, or Firm* — Wilson, Sonsini, Goodrich & Rosati

(57) ABSTRACT

Computer-based systems, software, and computer-implemented methods for creating an index of securities based upon various data transformations of risk factor metrics regarding entities or securities associated with the entities and weighting each index member in proportion to its combined transformed weighting value.

14 Claims, 9 Drawing Sheets

(56) References Cited

U.S. PATENT DOCUMENTS

| | | | |
|---|---|---|---|
| 2007/0005471 A1* | 1/2007 | Ho et al. | 705/35 |
| 2007/0005476 A1* | 1/2007 | Ho et al. | 705/35 |
| 2007/0022033 A1* | 1/2007 | Ho et al. | 705/35 |
| 2007/0055598 A1* | 3/2007 | Arnott et al. | 705/35 |
| 2007/0055599 A1* | 3/2007 | Arnott | 705/35 |
| 2007/0208645 A1* | 9/2007 | Hoffman et al. | 705/36 R |
| 2008/0071699 A1* | 3/2008 | Catalano-Johnson | 705/36 R |
| 2008/0071700 A1* | 3/2008 | Catalano-Johnson | 705/36 R |
| 2008/0198389 A1* | 8/2008 | Yoo et al. | 356/626 |
| 2008/0222052 A1* | 9/2008 | Choueifaty | 705/36 R |
| 2008/0270317 A1* | 10/2008 | Waldron et al. | 705/36 R |
| 2008/0288416 A1* | 11/2008 | Arnott et al. | 705/36 R |
| 2008/0294539 A1* | 11/2008 | Bassuk et al. | 705/35 |
| 2010/0063942 A1* | 3/2010 | Arnott et al. | 705/36 T |
| 2010/0191628 A1* | 7/2010 | Arnott et al. | 705/30 |
| 2010/0262563 A1* | 10/2010 | Arnott et al. | 705/36 R |
| 2010/0287116 A1* | 11/2010 | Arnott et al. | 705/36 R |
| 2011/0202475 A1* | 8/2011 | Choueifaty | 705/36 R |
| 2011/0307415 A1* | 12/2011 | Martellini et al. | 705/36 R |
| 2012/0215717 A1* | 8/2012 | Arnott et al. | 705/36 R |
| 2012/0246094 A1* | 9/2012 | Hsu et al. | 705/36 R |
| 2013/0117199 A1* | 5/2013 | Arnott et al. | 705/36 R |
| 2013/0246306 A1* | 9/2013 | Adams et al. | 705/36 R |

OTHER PUBLICATIONS

Ferholz, Robert; Garvy, Robert; Hannon, John, "Diversity-Weighted Indexing: A new approach to investing", Journal of Portfolio Management; Winter 1998, 24, 2, pp. 1-9.*

Ostermark, Ralf, "Hedging with options and cardinality constraints in multi-period portfolio management systems", Kybernetes, 40.5/6 (2011): pp. 703-718.*

Kaplan, Paul, "Let's not All Become Fundamental Indexers Just Yet", Journal of Indexes, Jan./Feb. 2009, pp. 1-4.*

Jones, Robert. C, "Earnings basis for weighting stock portfolios", Pension & Investments, Aug. 6, 1990, pp. 1-2.*

Arnott, Robert D. and Hsu, Jason C. And Moore, Philip, Fundamental Indexation, Oct. 7, 2004 [Online] Available at SSRN: http://ssrn.com/abstract=604842 or http://dx.doi.org/10.2139/ssrn.604842.

Fama, Eugene F., French, K. "Common Risk Factors in the Returns on Stocks and Bonds." Journal of Financial Economics, vol. 33, No. 1 (Feb. 1993), pp. 3-56.

Markowitz, Harry M. "Portfolio Selection." The Journal of Finance, vol. 7, No. 1 (Mar. 1952), pp. 77-91.

* cited by examiner

US 8,645,256 B1

TRANSFORMATION WEIGHTED INDEXES OFFERING CONCENTRATED MULTI-RISK FACTOR EXPOSURE

CROSS-REFERENCE TO RELATED APPLICATIONS

This application claims the benefit of U.S. Application Ser. No. 61/695,919, filed Aug. 31, 2012, which is hereby incorporated by reference in its entirety.

BACKGROUND OF THE INVENTION

In finance, an index is a statistical aggregate that usually refers to a measure of economic performance or market performance. For example, a stock market index is a method of measuring the value of a section of the stock market. Investors sometimes use stock indexes to describe market conditions, to benchmark investment results, or to construct portfolios. Index construction methodologies generally determine the relative contribution of each member to the overall index using equal weighting or some measure of market or fundamental data. Portfolios based on such indexes suffer from numerous disadvantages. For instance, in indexes weighted by market capitalization or a measure of fundamental size, a small number of constituents tend to have disproportionately large weight, thus introducing a degree of idiosyncratic risk. On the other extreme, equal weight indexes have horizontal weighting curves and give no extra weight to securities that may possess desirable characteristics as determined through various techniques of security analysis. Further, in market or fundamentals-based indexes, the difference in weights between constituents is uneven, leading to a lack of standardization between indexes or even in the same index over time. These conventional indexes are rigid, lacking any mechanism to alter their weighting percentage curves to resolve these structural limitations. Moreover, modern finance recognizes various risk factors, sometimes referred to as anomalies, which account for investment performance, such as the size, value, momentum, and low volatility effects. Existing indexes offer only incidental, narrow, and/or exclusionary access to these risk factors. Therefore, a distinct disadvantage is that these indexes fail to take advantage of a synergistic effect of holdings that are rich in multiple risk factors. Finally, portfolios based on these indexes require many separate funds to gain broad risk factor exposure, increasing complexity and costs associated with portfolio management. Existing methods cannot provide consistent, customizable, direct, and diversified exposure to the many investment risk factors in a single index.

SUMMARY OF THE INVENTION

Various embodiments disclose systems, computer programs, and methods for securities index construction. While prior indexing methodologies utilize raw data values, the systems, software, and methods described herein transform the variables into new, standardized, and versatile forms that produce remarkably different indexes and are optionally further combined to yield entirely novel composite indexes. The systems, software, and methods described herein provide a number of advantages. First is the ability to use both fundamental and market data, simultaneously, to produce a weighting. Second, the ability to incorporate both numeric and non-numeric data into constituent weightings. Third, the employment of novel data transformations such as binary, inverse, linear, log, percentile, power, rank, root, and variance-stabilization transformations. Fourth, various transformation applications provide the ability to shape weighting percentage curves. Fifth, mitigation of overexposure to poor securities and underexposure to excellent securities, as compared with conventional indexes. Sixth, direct access all known investment risk factors for entities or securities associated with entities. Seventh, any degree of emphasis or de-emphasis on concentrations of a given risk factor in a single index. Eighth, simplification of portfolio management because a single index will be able to provide comprehensive, diversified risk factor exposure, thereby negating the need to purchase and rebalance multiple index funds from various distributors.

In some embodiments, advantages of the systems, software, and methods described herein include utilization of percentile transformations, which offer many beneficial features. Percentiles are indifferent toward negative data or unit type, they mitigate outliers, and separate densely clustered raw data values. Relative to equal weighting, indexes weighted by percentiles enable a steeper weighting percentage curve without excessive exposure to the most prominent members. In other words, the weighting percentage curve is gradually and consistently sloped rather than horizontal, which current methods are unable to replicate. Thus, a percentile transformation of a single risk factor metric works to reduce overexposure to the most prominent index members while permitting substantial differentials in weighting concentrations on extreme ends of the index. Moreover, one may combine percentiles for two or more metrics to produce uniquely tilted curves. For example, an average of multiple percentiles will result in a weighting percentage curve that is convex and concave at different points. Alternatively, if one instead multiplies those same percentiles, a convex curve that produces higher factor concentration results. Optionally, one can perform a subsequent percentile transformation of the percentile average or product in preparation for additional transformations.

In some embodiments, advantages of the systems, software, and methods described herein include utilization of power transformations. Powers provide the ability to bend the weighting percentage curve to produce a larger or smaller differential in the highest/lowest-weighted members. Power transformations are suitable to create "large cap" and "small cap" indexes (or "large company" or "small company" or any other orientation, depending on the nature of the index) without the need to exclude hundreds or thousands of securities, by bending the weighting percentage curve more or less steeply.

In some embodiments, the systems, methods, and computer programs disclosed herein use risk factor metrics (i.e., entity-specific indicators of investment merit) to create indexes of securities. In some embodiments, a Transformation Weighted Index (TWI) is suitable to serve as a model for an investment portfolio that reduces concentrations in securities with undesirable characteristics while offering advantageous features such as broad diversification and practical implementation.

Disclosed herein, in various embodiments, are computer-implemented methods for design and maintenance of a first TWI, wherein members may be weighted based on one or more data transformations of one or more risk factor metrics regarding entities associated with securities and/or securities associated with the entities.

In other embodiments are computer-implemented methods for design and maintenance of a second TWI, wherein member weights may be computed by one or more data transformations of one or more fundamental size metrics regarding entities associated with securities.

In further embodiments, two TWIs combine to form a composite TWI. Optionally, in such embodiments, a composite TWI may satisfy additional investment objectives. By way of non-limiting example, in a composite TWI, member weightings may combine high investment capacity with high multi-risk factor exposure.

In some embodiments, the systems, methods, and computer programs disclosed herein further include: maintaining a TWI by reestablishing member weightings based upon changes in securities that are members of said TWI or after new data for an entity or its associated security is available.

In another aspect, disclosed herein are computer-implemented methods comprising the steps of: creating an index of securities, by a processor, by selecting securities from a universe of securities to be index members based upon security type or investment capacity, the investment capacity comprising: thresholds of liquidity or market capitalization; and performing, by a processor, one or more data transformations of one or more risk factor metrics regarding index members; and weighting the index members, by a processor, based upon dividing said one or more data transformations by the sum of said data transformations of all index members.

In one aspect, disclosed herein are computer-readable storage media encoded with a computer program including instructions executable by a processor to create an application comprising: a software module configured to select a universe of securities or receive input indicating a universe of securities; a software module configured to select one or more risk factor metrics or receive input indicating one or more risk factor metrics; a software module configured to create an index, the index comprising a plurality of member securities selected from the universe of securities, each member security having a weight in the index; provided that selection of member securities and the weight in the index of each member security is determined by applying one or more transformations to the one or more risk factor metrics for each security in the universe of securities according to the following formula:

$$w_i = [f(m)_1 * f(m)_2 \ldots f(m)_q]_i / \Sigma [f(m)_1 * f(m)_2 \ldots f(m)_q]_n$$

wherein i is a given security,
wherein w is the weight of a security in the index,
wherein m is a risk factor metric,
wherein n is the number of member securities in an index,
wherein $f(m)_1$ is a data transformation weighting value of a first risk factor metric,
  wherein $f(m)_2$ is a data transformation weighting value of a second risk factor metric,
  wherein $f(m)_q$ is a data transformation weighting value of an ultimate risk factor metric, and
  wherein * is a mathematical operation to be performed on transformed risk factor metrics.

In some embodiments, the one or more risk factor metrics include a non-numeric datum for which a value or score has been substituted. In some embodiments, the one or more data transformations are selected from: a binary transformation, inverse transformation, linear transformation, log transformation, percentile transformation, power transformation, rank transformation, root transformation, or variance-stabilization transformation. In some embodiments, the weight of a security in the index is determined by applying one or more subsequent data transformations to one or more of the previously calculated data transformation weighting values. In some embodiments, the mathematical operation to be performed on transformed risk factor metrics is selected from: multiplication, division, addition, subtraction, an average, weighted average, or a median. In some embodiments, the first, second, and subsequent risk factor metrics are the same metric. In other embodiments, the first, second, and subsequent risk factor metrics are different metrics. In some embodiments, the application further comprises a software module configured to update the values of the one or more risk factor metrics for each security in the universe of securities. In further embodiments, the application further comprises a software module configured to add or remove securities from the index by re-applying the one or more data transformations to the updated one or more risk factor metrics for each security in the universe of securities. In further embodiments, the application further comprises a software module configured to update the weight of securities in the index by re-applying the one or more data transformations to the updated one or more risk factor metrics for each security in the universe of securities.

In another aspect, disclosed herein are computer-implemented methods comprising the steps of: creating an index of securities, by a processor, by selecting securities from a universe of securities to be index members based upon one or more data transformations of one or more risk factor metrics regarding entities or securities associated with the entities; and weighting each index member, by a processor, based upon dividing said one or more data transformations by the sum of said one or more data transformations for all said index members. In some embodiments, the securities comprise a whole or fractional unit of interest in one or more of a: note; stock; treasury stock; bond; debenture; certificate of interest or participation in a profit-sharing agreement or in an oil, gas, or mineral royalty or lease; collateral trust certificate; pre-organization certificate or subscription; transferable share; investment contract; voting-trust certificate; certificate of deposit, for a security, put, call, straddle, option, or privilege on a security, certificate of deposit, or group or index of securities; put, call, straddle, option, or privilege entered into on a national securities exchange relating to foreign currency; certificate of interest or participation in, temporary or interim certificate for, receipt for, or warrant or right to subscribe to or purchase, any of the foregoing; currency or any note, draft, bill of exchange, or banker's acceptance which has a maturity at the time of issuance of not exceeding nine months, exclusive of days of grace, or any renewal thereof the maturity of which is likewise limited; a physical resource; inventory; finished good; and intellectual property. In some embodiments, the one or more risk factor metrics are for the most recent period, an average over any time period, a change over any time period, or the variance over any time period. In some embodiments, the one or more data transformations comprise: conversion of a set of numerical or non-numerical data into a transformed data set by the application of a deterministic mathematical function. In further embodiments, the deterministic mathematical function is selected from: a binary transformation, an inverse transformation, a linear transformation, a log transformation, a percentile transformation, a power transformation, a rank transformation, a root transformation, and a variance-stabilization transformation. In some embodiments, selecting securities as index members comprises: calculating, by a processor, for each entity associated with a security in the universe of securities, a first data transformation weighting value based upon a risk factor metric; calculating, by a processor, one or more additional data transformation weighting values based upon one or more risk factor metrics; calculating, by a processor, a combined data transformation weighting value specific to each entity associated with a security by applying a mathematical relationship for each data transformation weighting value; and selecting, by a processor, a subset of securities from the universe of securities to be index members based upon said combined data transformation weighting values. In some embodiments, weighting each index member comprises: calculating, by a processor, a first data transformation weighting value based upon a risk factor metric for each index member; calculating, by a processor, one or more additional data transformation weighting values based upon one or more risk factor metrics for each index member; calculating, by a processor, a combined data transformation weighting value specific to each entity associated with a security by applying a mathematical relationship for each data transformation weighting value; calculating, by a processor, a weighting percentage by dividing said combined data transformation weighting value by the sum of said combined data transformation weighting values of all index members; and weighting, by a processor, each index member in proportion to said weighting percentage. In some embodiments, the method further comprises the step of maintaining the index at periodic time intervals, by a processor, wherein maintaining comprises: adding and removing index members based upon one or more data transformations of one or more risk factor metrics regarding entities or securities associated with the entities as said one or more risk factor metrics change over time. In some embodiments, the method further comprises the step of maintaining the index at periodic time intervals, by a processor, wherein maintaining comprises: adjusting weightings of index members based upon dividing said combined data transformation weighting value by the sum of said combined data transformation weighting values of all index members.

In another aspect, disclosed herein are computer-implemented systems comprising: a digital processing device comprising an operating system configured to perform executable instructions and a memory device; a computer program including instructions executable by the digital processing device to create an application comprising: a software module configured to create an index of securities by selecting securities from a universe of securities to be index members based upon one or more data transformations of one or more risk factor metrics regarding entities or securities associated with the entities; and a software module configured to weight each index member based upon dividing said one or more data transformations by the sum of said data transformations of all index members. In some embodiments, the securities comprise a whole or fractional unit of interest in one or more of a: note; stock; treasury stock; bond; debenture; certificate of interest or participation in a profit-sharing agreement or in an oil, gas, or mineral royalty or lease; collateral trust certificate; pre-organization certificate or subscription; transferable share; investment contract; voting-trust certificate; certificate of deposit, for a security, put, call, straddle, option, or privilege on a security, certificate of deposit, or group or index of securities; put, call, straddle, option, or privilege entered into on a national securities exchange relating to foreign currency; certificate of interest or participation in, temporary or interim certificate for, receipt for, or warrant or right to subscribe to or purchase, any of the foregoing; currency or any note, draft, bill of exchange, or banker's acceptance which has a maturity at the time of issuance of not exceeding nine months, exclusive of days of grace, or any renewal thereof the maturity of which is likewise limited; a physical resource; inventory; finished good; and intellectual property. In some embodiments, the one or more data transformations comprise: conversion of a set of numerical or non-numerical data into a transformed data set by the application of a deterministic mathematical function. In further embodiments, the deterministic mathematical function is selected from: a binary transformation, an inverse transformation, a linear transformation, a log transformation, a percentile transformation, a power transformation, a rank transformation, a root transformation, and a variance-stabilization transformation. In some embodiments, selecting securities as index members comprises: calculating for each entity associated with a security in the universe of securities, a first data transformation weighting value based upon a risk factor metric; calculating one or more additional data transformation weighting values based upon one or more risk factor metrics; calculating a combined data transformation weighting value specific to each entity associated with a security by applying a mathematical relationship for each data transformation weighting value; and selecting a subset of securities from the universe of securities to be index members based upon said combined data transformation weighting values. In some embodiments, weighting the index members comprises: calculating a first data transformation weighting value based upon a risk factor metric for each index member; calculating one or more additional data transformation weighting values based upon one or more risk factor metrics for each index member; calculating a combined data transformation weighting value specific to each entity associated with a security by applying a mathematical relationship to each data transformation weighting value; calculating a weighting percentage by dividing said combined data transformation weighting value by the sum of said combined data transformation weighting values of all index members; and weighting each index member in proportion to said weighting percentage. In some embodiments, the application further comprises a software module configured to maintain the index at periodic time intervals, wherein maintaining comprises: adding and removing index members based upon one or more data transformations of one or more risk factor metrics regarding entities or securities associated with the entities as said one or more risk factor metrics change over time. In some embodiments, the application further comprises a software module configured to maintain the index at periodic time intervals, wherein maintaining comprises: adjusting weightings of index members based upon dividing said combined data transformation weighting value by the sum of said combined data transformation weighting values of all index members.

In another aspect, disclosed herein are computer-readable storage media encoded with an index, the index comprising a plurality of member securities selected from a universe of securities, each member security having a weight in the index; provided that selection of the member securities and the weight in the index of each member security is determined by applying one or more data transformations to the one or more risk factor metrics for each security in the universe of securities according to the following formula:

$$w_i = [f(m)_1 * f(m)_2 \ldots f(m)_q]_i / [f(m)_1 * f(m)_2 \ldots f(m)_q]_n$$

wherein i is a given security,
wherein w is the weight of a security in the index,
wherein m is a risk factor metric,
wherein n is the number of member securities in an index,
wherein $f(m)_1$ is a data transformation weighting value of a first risk factor metric,
wherein $f(m)_2$ is a data transformation weighting value of a second risk factor metric,
wherein $f(m)_q$ is a data transformation weighting value of an ultimate risk factor metric, and
    wherein * is a mathematical operation to be performed on transformed risk factor metrics.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

DETAILED DESCRIPTION OF THE INVENTION

Figure 1:
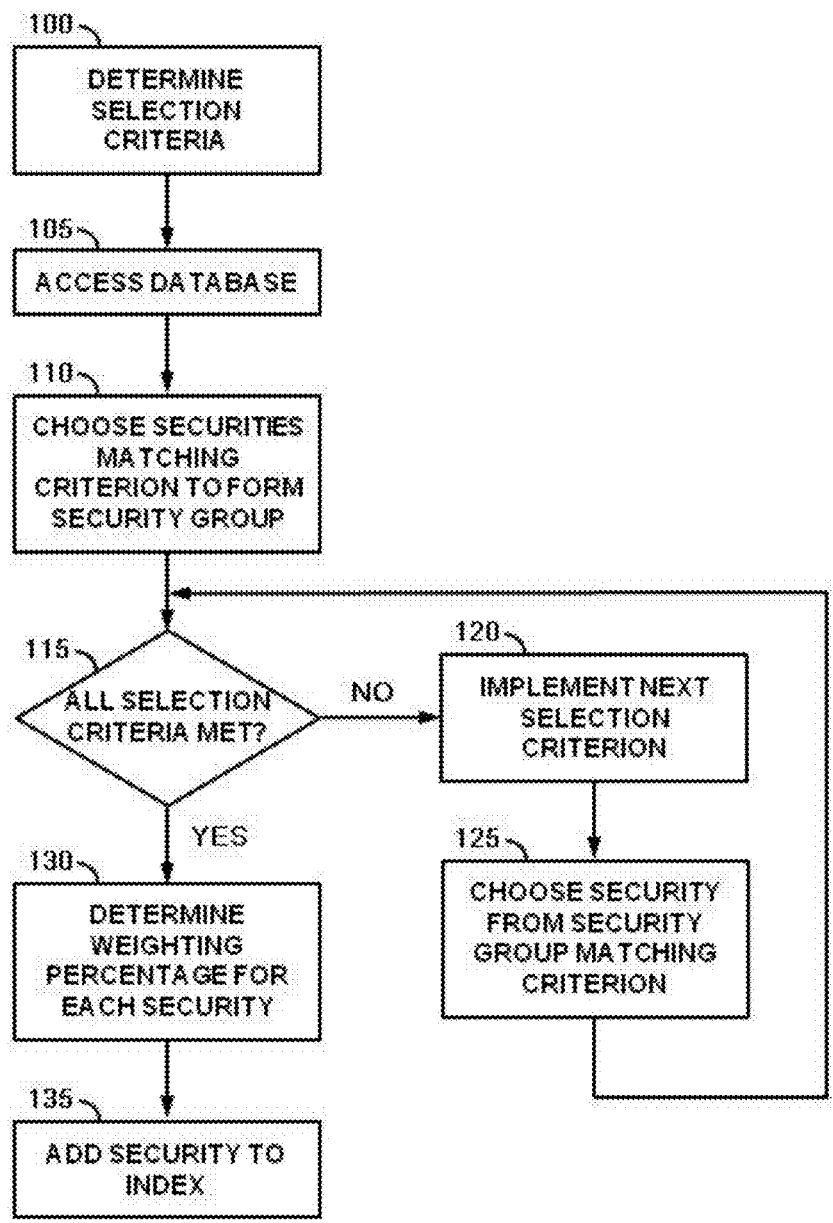
FIG. 1 shows a non-limiting, exemplary flowchart of a method for selecting a security for inclusion in a Transformation Weighted Index (TWI).

Conventional index weighting methodologies fail to provide comprehensive, concentrated exposure to desirable investment risk factors in a single index. In these indexes, risk factor exposure tends to be either incidental or, if targeted explicitly, very narrow and exclusionary. All such indexes fail to capture the synergistic benefit from concentrating weights on those securities that exhibit multiple risk factors simultaneously, as indicated by various metrics used to assess the presence of a risk factor. Further, investors who seek risk factor exposure must purchase multiple index-based products to achieve complete exposure, which can add needless cost and complexity. Accordingly, described herein, in certain embodiments, are computer-readable storage media encoded with a computer program including instructions executable by a processor to create an application comprising: a software module configured to select a universe of securities or receive input indicating a universe of securities; a software module configured to select a risk factor metric or receive input indicating a risk factor metric; a software module configured to create an index, the index comprising a plurality of member securities selected from the universe of securities, each member security having a weight in the index; provided that selection of member securities and the weight in the index of each member security is determined by applying a data transformation to the risk factor metric for each security in the universe of securities according to the following formula:

$$w_i = [f(m)_1 * f(m)_2 \ldots f(m)_q]_i / \Sigma [f(m)_1 * f(m)_2 \ldots f(m)_q]_n$$

wherein i is a given security,
wherein w is the weight of a security in the index,
wherein m is a risk factor metric,
wherein n is the number of member securities in an index,
wherein $f(m)_1$ is a data transformation weighting value of a first risk factor metric,
wherein $f(m)_2$ is a data transformation weighting value of a second risk factor metric,
wherein $f(m)_q$ is a data transformation weighting value of an ultimate risk factor metric, and
wherein * is a mathematical operation to be performed on transformed risk factor metrics.

Also described herein, in certain embodiments, are computer-implemented methods comprising the steps of: creating an index of securities, by a processor, by selecting securities from a universe of securities to be index members based upon one or more data transformations of one or more risk factor metrics regarding entities or securities associated with the entities; and weighting each index member, by a processor, based upon dividing said one or more data transformation weighting value by the sum of said data transformation weighting values of all index members said one or more data transformations.

Also described herein, in certain embodiments, are computer-implemented methods comprising the steps of: creating an index of securities, by a processor, by selecting securities from a universe of securities to be index members based upon security-type or investment capacity, the investment capacity comprising: thresholds of liquidity or market capitalization; and performing, by a processor, one or more data transformations of one or more risk factor metrics regarding index members; and weighting the index members, by a processor, based upon dividing said one or more data transformation weighting value by the sum of said data transformation weighting values of all index members said one or more data transformations.

Also described herein, in certain embodiments, are computer-implemented systems comprising: a digital processing device comprising an operating system configured to perform executable instructions and a memory device; a computer program including instructions executable by the digital processing device to create an application comprising: a software module configured to create an index of securities by selecting securities from a universe of securities to be index members based upon one or more data transformations of one or more risk factor metrics regarding entities or securities associated with the entities; and a software module configured to weight each index member based upon dividing said one or more data transformation weighting value by the sum of said data transformation weighting values of all index members said one or more data transformations.

Also described herein, in certain embodiments, are computer-readable storage media encoded with an index, the index comprising a plurality of member securities selected from a universe of securities, each member security having a weight in the index; provided that selection of the member securities and the weight in the index of each member security is determined by applying one or more data transformations to the one or more risk factor metrics for each security in the universe of securities according to the following formula:

$$w_i = [f(m)_1 * f(m)_2 \ldots f(m)_q]_i / \Sigma [f(m)_1 * f(m)_2 \ldots f(m)_q]_n$$

wherein i is a given security,
wherein w is the weight of a security in the index, wherein m is a risk factor metric,
wherein n is the number of member securities in an index,
wherein $f(m)_1$ is a data transformation weighting value of a first risk factor metric,
wherein $f(m)_2$ is a data transformation weighting value of a second risk factor metric,
wherein $f(m)_q$ is a data transformation weighting value of an ultimate risk factor metric, and
wherein * is a mathematical operation to be performed on transformed risk factor metrics.

Transformation Weighted Indexes

Generally, an embodiment of the present invention takes the form of a Transformation Weighted Index (TWI) comprising at least two securities. In further embodiments, the securities are weighted by data transformations of risk factor metrics regarding entities and/or securities associated with the entities.

In some embodiments, "securities" generally refers to any whole or fractional unit of interest in any investable asset.

In some embodiments, "weighting percentage" generally refers to the determination of the degree to which a security will be represented in an index based on the relative presence of a given factor relating to the security or the entity affiliated with the security. For example, in a capitalization-weighted index of equities, each included equity affects the index in proportion to the number of shares of the equity outstanding multiplied by the equity's price.

In some embodiments, a "data transformation" generally refers to conversion of a set of numerical or non-numerical data into a transformed data set by the application of a deterministic mathematical function. In further embodiments, each data point m is replaced with the transformed value $y_i=f(m)$, where f is a function. In various embodiments, data transformations include, but are not limited to, inverse transformations, linear transformations, log transformations, percentile transformations, power transformations, rank transformations, binary digit assignments, root transformations, or variance-stabilization transformations. In some embodiments, data transformations are specific to the field of statistics and are wholly distinct from the concept of data manipulation (in other words the two concepts do not have overlapping definitions and are not synonymous). In cases where data are non-numerical, such as when an entity uses First In First Out (FIFO) or Last In First Out (LIFO) accounting, a number will be assigned to each datum, and this number may be further transformed.

In some embodiments, "weighting values" generally refers to output values of data transformations. In various embodiments, exemplary weighting values include, but are not limited to, percentile and power transformations of revenue, share price momentum, share price volatility, and so forth.

In some embodiments, a "risk factor metric" generally refers to an entity-specific measure (or signal or indicator) of investment merit, as would concern a financial economist tasked with allocating capital across security markets under conditions of uncertainty. In a particular non-limiting embodiment, risk factors include market capitalization, valuation, price momentum, and price volatility. Risk factor metrics used to signal these risk factors include conventional as-reported and manipulated data such as Total Revenue, 4-quarter Price Change, and 5-quarter Price Standard Deviation, respectively.

In some embodiments, "accounting or non-accounting data" generally refers to information that relates to an entity or an entity's associated securities. In further embodiments, such information is contained in said entity's financial statements or in other reports or data feeds produced by or about an entity or an entity's securities.

In some embodiments, "as-reported" generally refers to an original datum that has not been manipulated whereas "manipulated" generally refers to an original datum that has been combined with or related to one or more other data values (which may include the same datum from other periods). In further embodiments, both as-reported and manipulated data may be transformed by a function into a new value for the purposes of determining weighting within a TWI. Non-limiting examples of as-reported data include Operating Revenue, Total Assets, Net Income, Operating Cash Flow, and Share Price for a given period or point in time. Non-limiting examples of manipulated data include Asset Turnover (which may be defined as Revenue divided by Assets), Accruals (which may be defined as Net Income subtracted from Operating Cash Flow) or Price Volatility (which may be measured by standard deviation of a share price) for a given period.

In some embodiments, "security" or "securities" comprise any of a whole or fractional unit of interest in one or more of a: note; stock; treasury stock; bond; debenture; certificate of interest or participation in a profit-sharing agreement or in an oil, gas, or mineral royalty or lease; collateral trust certificate; pre-organization certificate or subscription; transferable share; investment contract; voting-trust certificate; certificate of deposit, for a security, put, call, straddle, option, or privilege on a security, certificate of deposit, or group or index of securities; put, call, straddle, option, or privilege entered into on a national securities exchange relating to foreign currency; certificate of interest or participation in, temporary or interim certificate for, receipt for, or warrant or right to subscribe to or purchase, any of the foregoing; currency or any note, draft, bill of exchange, or banker's acceptance which has a maturity at the time of issuance of not exceeding nine months, exclusive of days of grace, or any renewal thereof the maturity of which is likewise limited; a physical resource; inventory; finished good; and intellectual property.

In various embodiments, suitable risk factor metrics include, by way of non-limiting examples, as-reported and manipulated accounting or non-accounting data regarding entities and/or securities associated with the entities. In further embodiments, the as-reported and manipulated accounting or non-accounting data include, by way of non-limiting examples, all variations of Accounts Payable, Accounts Receivable, Accrued Expenses, Accrued Interest, Accrued Interest Payables, Accrued Investment Income, Accrued Liabilities, Accrued Taxes, Accumulated Depreciation & Depletion, Additional Paid In Capital, Allowance for Loans and Lease Losses, Bankers Acceptance Outstanding, Building & Improvements, Capital Lease Obligations, Cash and Due from Banks, Cash and Equivalents, Claims and Claim Expense, Common Par, Common Stock Equity, Construction in Progress, Cost in Excess, Cumulative Translation Adjustment, Current Deferred Income Taxes, Deferred Acquisition Cost, Deferred Income Taxes, Deferred Revenues, Due from Customers Acceptance, Federal Funds Purchased/Securities Sold, Federal Funds Sold/Securities Purchased, Finished Goods, Foreign Currency Adjustments, Future Policy Benefits, Gross Fixed Assets (Property, Plant, and Equipment), Intangibles, Interest Bearing Deposits, Inventories, Inventories Adjustments & Allowances, Inventory Valuation computer-implemented method, Investment Securities, Net, Land & Improvements, Loans Receivable, Long Term Debt, Machinery, Furniture & Equipment, Marketable Securities, Minority Interest, Net Fixed Assets (Net Property, Plant, and Equipment), Net Loans, Net Other Unearned Losses/Gains, Net Unrealized Loss/Gain on Foreign Currencies, Net Unrealized Loss/Gain on Investments, Non-Current Deferred Income Taxes, Non-Interest Bearing Deposits, Notes Payable, Other Assets, Other Current Assets, Other Current Liabilities, Other Equity Adjustments, Other Fixed Assets, Other Inventories, Other Liabilities, Other Non-Current Assets, Other Non-Current Liabilities, Other Payables, Other Receivables, Participating Policyholder Equity, Policy Holder Funds, Preferred Equity Outside Stock Equity, Preferred Securities of Subsidiary Trust, Preferred Stock Equity, Preferred Stock Equity, Premises and Equipment, Prepaid Expenses, Purchased Components, Raw Materials, Receivables, Restricted Cash, Retained Earnings, Separate Accounts Business, Shares Outstanding, Short Term Debt, Time Deposits Placed, Total Assets, Total Capitalization, Total Current Assets, Total Current Liabilities, Total Equity, Total Fixed Assets, Total Liabilities, Total Liabilities & Stock Equity, Non-Current Assets, Total Non-Current Liabilities, Trading Account Securities, Treasury Stock, Unearned Premiums, or Work in Progress, Adjustments to Revenue, Advertising, Amortization Deferred, Policy Acquisition Costs, Amortization, Amortization of Intangibles, Capitalized Lease Obligations, Commercial and Industrial Template, Cost of Sales, Current and Future Benefits, Deposits, Depreciation, Depreciation Unreconciled, Domestic Sales, Earnings from Equity Interest, Excise Taxes, Extraordinary Income/Losses, Federal Funds Purchased/Securities Sold, Federal Funds Sold/Purchased, Foreign Sales, Gross Operating Profit, Income before Income Taxes, Income from Cumulative Effect of Accounting Change, Income from Tax Loss Carry-forward, Income Taxes, Income Year-to-Date from Total Operations, Income, Acquired in Process Research and Development, Income, Restructuring and Merger and Acquisitions, Interest Bearing Deposits, Interest Expense, Interest Income, Investment Banking Profit, Investment Securities, Latest Quarter Indicator, Lease Financing Income, Loans, Loans Held for Resale, Minority Interest, Net Income Available for Common, Net Income from Continuing Operations, Net Income from Discontinued Operations, Net Income from Total Operations, Net Interest Income/Expense, Net Occupancy Expense, Net Realized Capital Gains, Normalized Income, Operating Income, Operating Income After Depreciation, Operating Income before Depreciation (EBITDA), Operating Revenue (Revenue/Sales), Other Gains (Losses), Other Income, Net Other Interest Expense, Other Interest Income, Other Money Market Investments, Other Non-Interest Expense, Other Non-Interest Income, Other Service Charges, Other Special Charges, Policy Acquisition Costs, Pre-tax Income (EBT), Preferred Dividends, Preferred Securities of Subsidiary Trust, Premium Tax/Credit, Premiums Earned, Promotions and Advertising, Property-Liability Insurance Claims, Provision for Loan Loss, Research & Development Expense, Revenues Year-to-Date, Salaries and, Employee Benefits, Security Transactions, Selling, General and Administrative Expense, Service Charge on Deposit Accounts, Short Term Debt, Special Income/Charges, Time Deposits Placed, Total Income Avail for Interest Expense (EBIT), Total Interest Expense, Total Interest Income, Total Money Market, Investments, Total Net Income, Total Non-Interest Expense, Total Non-Interest Income, Total Revenues, Trading Account Securities, Trust Fees by Commissions, Acquisitions, Amortization, Amortization of Intangibles, Cash at Beginning of Period, Cash at End of Period, Cash Dividends Paid, Cash Flow, Cash from Disc. Financing Activities, Cash from Disc. Investing Activities, Change in Assets (Receivables), Change in Income Taxes, Change in Liabilities (Payables), Change of Short Term Debt, Deferred Income Taxes, Depreciation, Depreciation and Amortization, Effect of Exchange Rate Changes, Extraordinary (Gains) Losses, Free Cash Flow, (Increase) Decrease in Inventories, (Increase) Decrease in Other Current Liabilities, (Increase) Decrease in Other Current Assets, (Increase) Decrease in Other Working Capital, (Increase) Decrease in Payables, (Increase) Decrease in Prepaid Expenses, (Increase) Decrease in Receivables, Invested Capital, Investment Securities Gain, Issuance of Capital Stock, Issuance of Common Stock, Issuance of Debt, Issuance of Long Term Debt, Issuance of Preferred Stock, Net Cash from Continuing Operations, Net Cash from Discontinued Operations, Net Cash from Financing Activities, Net Cash from Investing Activities, Net Cash from Operating Activities, Net Change in Cash & Cash Equivalents, Net Change in Deposits, Net Income (Loss), Net Increase Federal Funds Sold, Net Policy Acquisition Costs, Net Premiums Receivables, Operating (Gains) Losses, Other Financing Activities, Other Financing Charges, Net, Other Investing Changes Net, Other Non-Cash Items, Payment of Cash Dividends, Provision for Loan Losses, Purchase of Investment Securities, Purchase of Long Term Investments, Purchase of Property, Plant, Equipment, Purchase of Short Term Investments, Purchase of Treasury Stock, Realized Investment Gains, Repayment of Debt, Repayment of Long Term Debt, Repurchase of Capital Stock, Sale of Long Term Investments, Sale of Property, Plant, Equipment, or Sale of Short Term Investments, Discontinued Operations, Restructurings, Divestures/Spin-offs, Mergers, Acquisitions, Ownership, Insider Trading, Officer Turnover, Chairman/CEO Separation, Related Party Transactions, Board Performance, Board Composition, Material Restatements, Late Filings, Amended Filings, Auditor Opinions, Auditor Changes, Audit Fees, Salaries, Supply, Demand, Stocks, Interest Rates, Security Pricing, Accruals, Capital Intensity, Asset Turnover, Inventory Turnover, Payables Turnover, Receivables Turnover, Sales Per Employee, Times Interest Earned, Total Coverage, Long-term Debt to Equity, Total Debt to Equity, Acid Ratio, Cash Conversion Cycle, Cash Ratio, Current Ratio, Book to Market, Dividend Yield, Earnings Yield, Free Cash Flow Yield, Price to Sales, Profit Margin, Return on Assets, Return on Capital, or Return on Equity for the most recent period, the change in any individual and combined accounting or non-accounting data regarding entities and/or securities associated with the entities over time, the average of any individual and combined accounting or non-accounting data regarding entities and/or securities associated with the entities over time, and the variance of any individual and combined accounting or non-accounting data regarding entities and/or securities associated with the entities over time.

In certain embodiments, any or all of the calculations, methodologies, strategies, operations, processes, and/or functions discussed herein (whether relating to selection or weighting) may be performed by the systems, software, or methods described herein, a third party, or a user. For example, any such calculations, methodologies, strategies, operations, processes, and/or functions discussed herein may be implemented in a hardware or software implementation, and may take the form of computer-readable instructions on a computer-readable storage medium. Accordingly, such calculations, methodologies, strategies, operations, processes, functions and so forth should be considered to be within the scope of the present invention.

Exemplary Selection Criteria

Many different types of securities are suitable to be represented in a TWI. Further, within the different security types, some securities may be more desirable (or otherwise preferred) for inclusion and/or relative representation in a TWI.

For example, while equities are one example of a security, an investor may prefer to hold a higher concentration in equities inferred, through various techniques of security analysis, to have greater investment merit based on their exposure to risk factors and anomalies including, but not limited to, size, value, momentum, volatility, accruals, profitability, earnings surprises, share issuance, financial distress, exchange rate, and governance. Such is the focus of the present invention. Other considerations are optionally employed as selection criteria to choose particular securities for inclusion within a TWI. Exemplary selection criteria include, but are not limited to, security type (i.e., equity, bond, put, call, option, future, and so forth), trading forum of security (i.e., NASDAQ, NYSE, Chicago Futures Exchange, and so forth), geographic location of issuing entity or headquarters thereof, date of security maturation, costs associated with transacting or owning the security (i.e., commissions, management fees, taxes, bid-ask spreads, and so forth), investment capacity (i.e., liquidity, market capitalization, and so forth), presence in another index (such as the Dow Jones Industrial Average, Russell 1000, S&P 1500, and so forth), and/or any other information regarding entities and/or securities associated with the entities.

It should be noted that, in various embodiments, selection criteria are satisfied in a number of ways, depending on the criteria. By way of non-limiting example, a primary TWI (from which composite TWIs are optionally created) optionally use a minimum data transformation weighting value (or output, e.g., a percentile) of a risk factor metric (e.g., Return on Assets) for affiliated entities as a selection criterion. Similarly, in another embodiment, a primary or composite TWI may be based on a minimum value resulting from a combination or relationship of two or more data transformation weighting values (e.g., a percentile of a first risk factor metric multiplied by a power transformation of a second risk factor metric, or a power transformation of a percentile based on a first risk factor metric). For such indexes, the minimum selection criterion represents a lower bound. Accordingly, in a particular embodiment, only securities having a product of a Book to Market percentile and a Return on Equity percentile equal to or greater than the selection criterion will be included in the TWI. Alternative embodiments, however, may optionally use a maximum product of a Book to Market percentile and a Return on Equity percentile as a selection criterion. In such a TWI, the selection criterion is an upper bound, and only securities having data transformation weighting values less than the criterion are included in the TWI. Thus, selection criteria optionally operate as an upper or lower bound, an exact value, or define a range.

Multiple selection criteria are suitable to be combined to yield a smaller universe of securities for inclusion in a TWI. Essentially, any combination or variation of selection criteria is suitable to determine securities eligible for weighting or inclusion in the makeup of a TWI. It should be understood that any selection criterion discussed herein is exemplary only and that variations and alternatives may be used.

Weighting Values and Weighting Percentages

In some embodiments, once securities matching certain selection criteria (or a single selection criterion) are determined, the securities are weighted. In further embodiments, a variety of different data transformations are optionally used to produce output values (weighting values) in order to weight securities in a TWI.

In some embodiments, component securities are weighted in a TWI by dividing the chosen weighting value by the sum of all weighting values for every security in the TWI, to arrive at a security weighting percentage. In such cases, the security in question then comprises a portion of the TWI equal to the security weighting percentage.

Expressed mathematically, the weighting formula for a TWI, in some embodiments, is as follows:

$$w_i = [f(m)_1]_i / \Sigma [f(m)_1]_n$$

wherein i is a given security,
wherein w is the weight of a security in the index,
wherein m is a risk factor metric,
wherein n is the number of member securities in the index, and
wherein $f(m)_1$ is a data transformation weighting value of a risk factor metric, As a non-limiting example, presume a TWI is an Accrual-based percentile-weighted equity TWI of 1000 companies. Also presume the sum of Accrual percentiles (weighting values) of all 1000 companies to be represented in the TWI is 50000%. Presuming the entity associated with equity #1 has an Accrual percentile of 50% within the chosen timeframe, equity #1's total weight in the exemplary TWI is: 50%/50000%=0.001, or 0.10%. Thus, in this example, equity #1 would compose 0.10% of the exemplary TWI. In the present embodiment, the weighting value is an Accrual percentile, although other weighting values may be used.

In another embodiment of the weighting methodology, the weighting percentage for a given security equals the product of two weighting values for the security divided by the sum of the product of every TWI member's two weighting values. Mathematically, this is expressed as:

$$w_i = [f(m)_1 * f(m)_2] / \Sigma [f(m_n)_1 * f(m_n)_2]$$

wherein i is a given security,
wherein w is the weight of a security in the index,
wherein m is a risk factor metric,
wherein n is the number of member securities in an index,
wherein $f(m)_1$ is a data transformation weighting value of a first risk factor metric,
wherein $f(m)_2$ is a data transformation weighting value of a second risk factor metric, and
wherein * is a multiplicative product.

The above mathematical expressions suitably accommodate any number of weighting values. Alternatively, in various embodiments, rather than multiplication, weighting values for each security can be combined through adding, subtracting, dividing, averaging, or determining a median.

As a non-limiting example of weighting employing the foregoing methodology, a TWI comprising 1000 companies based on Market Capitalization-to-Total Revenue and Price Momentum is indicated to have an aggregate Market Capitalization-to-Total Revenue and Price Momentum percentile product of approximately 25000% based on summed Total Revenue for the trailing four quarters and change in split-adjusted Share Price for the trailing four quarters. The weighting percentage for equity #1 in the TWI having an indicated Market Capitalization-to-Total Revenue and Price Momentum percentile of 75% and 100%, respectively, would be: [75%*100%]/[25000%]=75%/25000%=0.003, or 0.30%. In this example, the weighting value of 75% is calculated by first multiplying the Market Capitalization-to-Total Revenue percentile by the Price Momentum percentile for the company associated with equity #1. This same weighting value would then be calculated for every equity in the TWI and summed, the summation of which is the indicated aggregate Market Capitalization-to-Total Revenue and Price Momentum percentile product for all the companies included within the TWI (indicated, in this example, to be 25000%).

Additionally, as previously mentioned, weighting values are suitably time-based. By way of non-limiting example, the weighting value optionally takes the most recent quarter into account. However, the weighting value is suitably based on any measurable period of time, such as, by way of non-limiting examples, the past quarter, the past two or three quarters, the past year, the past ten years, and so forth.

Further, in some embodiments TWIs are re-weighted or otherwise rebalanced periodically. By way of non-limiting example, preferred stocks tracked by a TWI are re-selected every quarter or at various time intervals. By way of further non-limiting example, in a preferred-stock index securities are added to or dropped from a TWI as new entities issuing preferred stocks meet selection criteria or old entities fail to meet the same criteria. Similarly, indexes are optionally re-weighted at certain intervals, based on the weighting values of each included security at the time of the re-weighting interval.

TWI Creation

Figure 2:
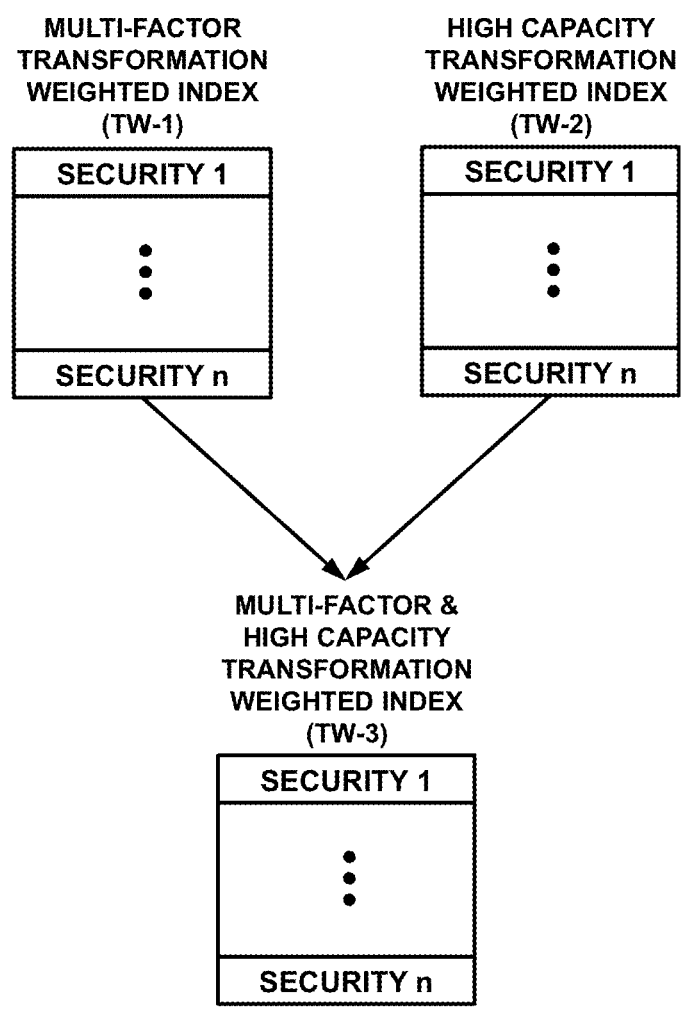
FIG. 2 shows a non-limiting, exemplary block diagram of three TWIs.

FIG. 1 is a non-limiting, exemplary flowchart depicting a method for creating a TWI having weighted securities, through operations of a computer. The operations described with respect to FIG. 1 and FIG. 2 are suitably carried out on any suitable computing device, including, but not limited to, personal computers, mainframe computers, minicomputers, personal data assistants ("PDAs"), mobile phones, Internet-enabled telephones, laptop computers, computer workstations, Web tablets, wireless devices, network servers, and any other currently available or to be available device(s) capable of executing the below-referenced operations, as set forth by the various embodiments of the systems, software, and methods described herein. The operations are suitably carried out at a single location or by a single computing device, or may be carried out by multiple computing devices connected to one another, distributed across, or otherwise capable of transmitting data across a network. Exemplary networks include, but are not limited to, packet switched networks (such as the Internet, intranets, extranets, Ethernets, local area networks (LANs), wide area networks (WANs), and the like), circuit switched networks (such as the "plain old telephone service" (POTS) and some cellular systems), combinations of packet and circuit switched networks, and any other communications topologies configured to facilitate the transmission of data.

Referring to FIG. 1, in a particular embodiment, the process begins at operation 100, in which one or more selection criteria (risk factor metrics) are determined. As discussed in more detail above and below, the selection criteria are chosen by an operator to determine which specific securities of a universe are to be represented in the TWI. Exemplary selection criteria are also given above and below.

Continuing to refer to FIG. 1, in operation 105, a database containing entries corresponding to various securities may be accessed. Typically, each database entry includes as-reported accounting and non-accounting data of the affiliated entity such as: a security trading symbol, name, or other identifier; a security price; a state or region in which an entity issuing, securing, or otherwise affiliated with the security has its corporate headquarters or location of business incorporation; an average daily U.S. dollar trading volume for the security; a trading exchange for the security; the number of common shares outstanding or free float shares outstanding for a security; and so forth. The database record may include additional information such as any of the selection criteria discussed herein, or may omit any or all of the information listed. Further, any one or more of the listed data may be transformed and used individually or in combination either as selection criteria or weighting values. The database may be provided by any of a variety of data purveyors. For example, the present embodiment employs a customized database provided through FACTSET RESEARCH SYSTEMS. Alternate embodiments may use a database supplied by REUTERS, S&P COMPUTSTAT, THOMSON FINANCIAL, VALUE LINE, and/or AAII. Additionally, an affiliated entity's 10-O or 10-K filings with the Securities and Exchange Commission may supplement database information. Accordingly, these filings are also considered "databases" for purposes of this document.

Continuing to refer to FIG. 1, in operation 110, securities meeting or exceeding a first selection criterion are selected from the database. These securities form a security universe. Presuming only a single selection criterion exists, all securities in the security universe for which requisite data comprising the selection criterion will be represented in the TWI.

Continuing to refer to FIG. 1, in operation 115, the embodiment determines whether all selection criteria have been considered and compared against the securities in the security universe. If so, the embodiment proceeds to operation 130. Otherwise, the embodiment executes operation 120.

Continuing to refer to FIG. 1, in operation 120, the next selection criterion is implemented. Many times, securities may be subjected to analysis against multiple selection criteria, with only those securities meeting all criteria represented or included in the TWI.

Continuing to refer to FIG. 1, in operation 125, securities from the security universe established in operation 110 are compared against the selection criterion implemented in operation 120. Those securities matching this additional selection criterion remain in the security universe, while securities not meeting the selection criterion are discarded. Effectively, the security universe is winnowed to include only those securities matching every selection criterion implemented during operation of the selection process. After operation 125, operation 115 is again executed.

Continuing to refer to FIG. 1, if the embodiment determines in operation 115 that all selection criteria have been considered (and, correspondingly, that all securities remaining in the security universe satisfy all selection criteria), then operation 130 is executed. In operation 130, the weighting percentage for each security is determined. The process for determining a security's weighting percentage is discussed in more detail above, in the section entitled "Weighting values and Weighting Percentages."

Continuing to refer to FIG. 1, finally, in operation 135, the security is added to the TWI in the amount dictated by the weighting percentage determined in operation 130. The amount of the security may be measured in either dollar value or shares, depending on the nature of the TWI.

The above-described process (or portions thereof) may be implemented at any time, and in some embodiments occurs at regularly timed intervals. For example, a TWI may be subjected to the above process, or portions of the above process, once per year (as a further example, component companies may be selected as of the close of the last trading day in November for reconstitution on a set date in December) to determine which equities or securities will be included in the TWI. Generally speaking, this process is referred to as an "initial selection" the first time a TWI is created and a "reconstitution" when an already-existing Index is again subject to some portion of the process. More specifically, reconstituting refers to the application of the selection criteria to determine which securities remain in, and/or are to be included in, the TWI. "Reweighting," as used herein, refers to the process of determining each security's weighting percentage within the TWI and may occur quarterly, semi-annually, annually, or at any other reconstitution date. Similarly, "rebalancing" refers to adjustments made to a TWI, often at set intervals such as a quarterly basis, to reflect certain corporate actions, including the issuance or repurchase of common shares outstanding. The exact dates and/or times of any operations described herein, including reestablishment of weighting percentages, reconstitution, or rebalancing of a TWI may vary in alternative embodiments.

Alternate embodiments may implement the processes described herein, or portions thereof, for a TWI annually, semi-annually, quarterly, weekly, monthly, daily, and so forth. As another example, a TWI may be reconstituted periodically, for example every January, April, July, and October, to determine which equities initially selected for inclusion in the TWI no longer meet the selection criteria and are therefore removed from the TWI. This reconstitution may operate only on the equities initially selected to comprise the TWI, and so may constitute a narrowing or reduction in the number of securities in the TWI. In such a case, certain operations may be omitted, such as accessing a database in operation 105 and the formation of a security universe in operation 110, since the TWI already comprises the security universe in question.

Alternately, the reconstitution may operate to review all securities in a database, and thus may act to add securities that meet the selection criteria as of the rebalancing date. Additionally, some embodiments may vary the reconstitution period depending on the nature of the TWI.

Similar to reconstitution, reestablishment of weighting percentages for the TWI according to the above-referenced process occurs, in various embodiments, at any time, or at regular predetermined intervals, such as weekly, monthly, quarterly, annually, and so on. Further, reestablishment of weighting percentages occurs, in some embodiments, each time a reconstitution of the TWI is performed. In alternative embodiments, reestablishment of weighting percentages occurs more often than reconstitution. By way of non-limiting example, a TWI is optionally reconstituted annually, such as in December, and reweighted every six months, such as in June and at the next reconstitution in December. In another implementation, the TWI may be reconstituted and reweighted simultaneously and annually, such as in June.

In some embodiments, the above-referenced process, or portions thereof, is implemented substantially continuously as market and security data is received. By way of non-limiting example, a TWI value is optionally calculated during specific time intervals, such as every fifteen seconds, hour, day, month, second, and so forth, as desired. In further embodiments, as the TWI value changes, reflecting changes in the underlying market prices of the companies that comprise the TWI (presuming that market prices are included in any of the risk factor metrics transformed into weighting values), the weightings for each security typically vary from the weightings that were initially established using the weighting methodologies described herein. These variances generally continue to be affected by changes in risk factor metrics of the component companies until the next reestablishment of weighting percentages and/or reconstitution, at which time weightings are reestablished using the weighting methodologies described herein.

Although the above process has been described as a set of computer-implemented operations, it should be understood that the process may be carried out manually in order to identify securities for inclusion and weighting in a TWI. Accordingly, the present invention embraces both computer-implemented and non-computer-implemented processes for identifying and weighting securities in a TWI. It should also be understood that operations of the above-described process may be implemented or executed in an order other than that described without departing from the spirit or scope of the present invention. As one example, the database may be accessed prior to determining all selection criteria.

Exemplary TWI Creation

Implementation of various selection criteria for use with embodiments of the invention is now discussed. In an embodiment employing multiple selection criteria, a set of securities included in a TWI may be chosen to satisfy several different selection criteria. For example, criteria may include a business being incorporated in, or being headquartered in, a particular country, such as the United States, or particular countries within specific continents, such as Europe. Additional selection criteria may require a security to have outstanding common equity trading on a particular equity exchange, such as the NYSE, AMEX or NASDAQ National Market. In alternative embodiments, one, more or fewer selection criteria may be employed, depending on the goals assigned to the particular TWI involved.

Once a particular set of securities has been selected via one or more selection criteria, the same set of securities may be further apportioned to yield composite indexes composed solely of those included in the first, or "primary," TWI. Such a composite TWI may be formed by employing one or more additional selection criteria, which must be satisfied by each security of the primary TWI, for employment in the composite TWI. Further, the basis for the apportionment of the primary TWI may be a ranking of the securities of the primary TWI according to one of the original selection criteria (or a completely separate selection criterion). A specified percentage or number of securities chosen from some reference point within the ranked list of securities also may be used to constitute the composite TWI.

FIG. 2 provides a non-limiting example of two primary Transformation Weighted Indexes, TW-1 and TW-2, and a composite TW-3. All three indexes may contain identical securities. For example, TW-1, consisting of n equities, selected by way of one or more selection criteria, may be weighted according to a particular first weighting value, such as percentiles of Price Momentum. In the embodiment of FIG. 2, the primary TW-1 consists of all domestic equities associated with companies for which Price Momentum based on the trailing four quarters can be calculated. Securities selected for TW-1 must also have trailing four quarters of Total Revenue in order to subsequently be combined in TW-3. In the present example, TW-1 may be regarded as having a small entity and small market capitalization orientation in that no consideration to size was given in the weighting process, which is a preferred embodiment.

Referring to FIG. 2, a second primary Transformation Weighted Index, TW-2, may be created, as follows. TW-2, consisting of the same n equities as TW-1, may be weighted according to a particular two-step weighting value, such as percentiles of Total Revenue raised to a power. In the present example, TW-2 may be regarded as being oriented toward high investment capacity because the metric on which it is based is highly correlated with market capitalization, which is a preferred embodiment.

Continuing to refer to FIG. 2, once both TW-1 and TW-2 are formed, composite TW-3 can be formed. In the present non-limiting example, security weights in TW-3 are calculated by averaging the respective weighting values used as the basis for the weighting percentages in TW-1 and TW-2. Composite TW-3 may be thought of as having both a high factor exposure (depending on the one or more risk factor metrics used to create TW-1) and relatively high investment capacity.

Exemplary Transformation Weighted Indexes

Three exemplary TWIs (representing primary TW-1, primary TW-2, and composite TW-3) are presented herein. These TWIs are provided by way of illustration and not limitation; alternate embodiments may employ indexes based on different risk factors, using different metrics for the same risk factors, or including a different universe of securities. Tables summarizing each exemplary TWI are provided below.

TABLE 1

Notional TW-1 metrics, transformations, and weights for top 10 of 1000 stocks sorted by TW-1 Weighting Percentage in descending order

| Security | Valuation Metric | Momentum Metric | Volatility Metric | Value Metric Percentile | Momentum Metric Percentile | Volatility Metric Percentile | Percentile Average | Percentile of Percentile Average | Percentile of Percentile Average Raised to a Power of 2 | TW-1 Weighting Percentage |
|---|---|---|---|---|---|---|---|---|---|---|
| A | 2.93 | 0.11 | 0.04 | 0.93 | 0.12 | 0.93 | 0.66 | 1.00 | 1.00 | 0.30% |
| B | 3.76 | −0.04 | 0.03 | 0.96 | 0.02 | 0.98 | 0.65 | 1.00 | 1.00 | 0.30% |
| C | 2.22 | 0.05 | 0.02 | 0.88 | 0.07 | 1.00 | 0.65 | 1.00 | 0.99 | 0.30% |
| D | 4.95 | 0.06 | 0.05 | 0.97 | 0.07 | 0.87 | 0.64 | 1.00 | 0.99 | 0.30% |
| E | 2.67 | 0.05 | 0.04 | 0.92 | 0.07 | 0.94 | 0.64 | 1.00 | 0.99 | 0.30% |
| F | 6.15 | 0.13 | 0.06 | 0.98 | 0.15 | 0.78 | 0.64 | 0.99 | 0.99 | 0.30% |
| G | 2.04 | 0.05 | 0.03 | 0.86 | 0.07 | 0.98 | 0.63 | 0.99 | 0.99 | 0.30% |
| H | 2.69 | 0.10 | 0.05 | 0.92 | 0.12 | 0.86 | 0.63 | 0.99 | 0.98 | 0.30% |
| I | 7.33 | 0.19 | 0.07 | 0.99 | 0.24 | 0.64 | 0.62 | 0.99 | 0.98 | 0.30% |
| J | 4.31 | 0.74 | 0.21 | 0.96 | 0.87 | 0.02 | 0.62 | 0.99 | 0.98 | 0.29% |

The above table illustrates a TW-1, comprising 1000 hypothetical stocks as of a particular date, wherein the security weights are determined by calculating a percentile for three risk factor metrics, averaging these percentiles, calculating a percentile of this average, and raising the percentile of the average percentile to a power of two to compute a weighting percentage for each stock. For example, stock A's ("A") non-transformed Valuation metric value is 2.93, its non-transformed Momentum metric is 0.11, and its non-transformed Volatility metric is 0.04. The respective percentile values for these three metrics are 0.93, 0.12, and 0.93. Stock A's average percentile based on these three metrics is 0.66. Its percentile of this percentile average is 1.00, which remains at 1.00 when raised to an exponent of two. Thus, A's weight in the exemplary TWI shown in Table 1 would be its percentile of its percentile average raised to a power of two divided by the sum of that weighting value for all companies in the TWI, or: 1.00/331.83=0.30%.

Table 2 depicts a second exemplary TW-2. This TWI includes the same companies as TW-1, but uses a different weighting value based on a notional fundamental Size metric.

TABLE 2

Notional TW-2 based on a percentile transformation of a fundamental size metric raised to a power of 10, compared with TW-1 weights for the same stocks, shown in descending order of TW-1 weight

| Security | Fundamental Size Metric | Percentile of Fundamental Size Metric | Percentile of Fundamental Size Metric Raised to a Power of 10 | TW-2 Weighting Percentage | TW-1 Weighting Percentage |
|---|---|---|---|---|---|
| A | 30,771 | 0.89 | 0.29 | 0.33% | 0.30% |
| B | 27,878 | 0.88 | 0.28 | 0.30% | 0.30% |
| C | 37,913 | 0.92 | 0.42 | 0.46% | 0.30% |
| D | 40,940 | 0.92 | 0.44 | 0.49% | 0.30% |
| E | 33,910 | 0.91 | 0.37 | 0.41% | 0.30% |
| F | 109,899 | 0.98 | 0.84 | 0.93% | 0.30% |
| G | 6,040 | 0.58 | 0.00 | 0.01% | 0.30% |
| H | 18,189 | 0.84 | 0.16 | 0.18% | 0.30% |
| I | 98,160 | 0.98 | 0.80 | 0.89% | 0.30% |
| J | 103,831 | 0.98 | 0.82 | 0.90% | 0.29% |

As shown, the weighting percentages in Table 2 differ from the weighting percentages shown in Table 1. As an example, consider stock H ("H"). Stock H's indicated fundamental size metric is $18,189 million; its percentile of this size metric is 0.84, which declines to 0.16 when raised to a power of 10 (the sum of this weighting value for all 1000 stocks is 90.41). Accordingly, H's weighting percentage based on fundamental size is 0.18% of TW-2: 0.16/90.41=0.18%.

It should be noted that the weightings for other companies change more/less dramatically in a TWI based on fundamental size (TW-2) as compared to risk factor metrics (TW-1). For example, Company G's ("G") weighting may decrease and Company J's ("J") weighting increase substantially. This can be seen by comparing the relative weighting percentages of E and J in Table 1 versus the relative percentages for the same stocks in Table 2. Using the methodology described herein, TW-2 gives investors an opportunity to own a "high investment capacity" TWI.

Table 3 depicts a third exemplary TWI. Here, TW-3 is a composite of TW-1 and TW-2. It uses a different weighting value comprising: a multiplicative product of the weighting values used to set the weighting percentages of TW-1 and TW-2.

TABLE 3

Notional composite TW-3 based on multiplying the weighting values of TW-1 and TW-2, compared with weights for TW-1 and TW-2 as well as non-transformed fundamental size-based index, market capitalization weighting, and equal weighting; weights for the same stocks, shown in descending order of TW-1 weight

| Security | Percentile of Percentile Average Raised to a Power of 2 | Percentile of Fundamental Size Metric Raised to a Power of 10 | Product of TW-1 and TW-2 Weighting Values | TW-3 Weighting Percentage | TW-2 Weighting Percentage | TW-1 Weighting Percentage | Non-Transformed Fundamental Weighting Percentage | Market Capitalization Weighting Percentage | Equal Weghting Percentage |
|---|---|---|---|---|---|---|---|---|---|
| A | 1.00 | 0.29 | 0.29 | 0.67% | 0.33% | 0.30% | 0.22% | 0.06% | 0.10% |
| B | 1.00 | 0.28 | 0.27 | 0.62% | 0.30% | 0.30% | 0.20% | 0.04% | 0.10% |
| C | 0.99 | 0.42 | 0.41 | 0.94% | 0.46% | 0.30% | 0.28% | 0.09% | 0.10% |
| D | 0.99 | 0.44 | 0.44 | 0.99% | 0.49% | 0.30% | 0.30% | 0.04% | 0.10% |
| E | 0.99 | 0.37 | 0.36 | 0.83% | 0.41% | 0.30% | 0.25% | 0.07% | 0.10% |
| F | 0.99 | 0.84 | 0.83 | 1.89% | 0.93% | 0.30% | 0.80% | 0.09% | 0.10% |
| G | 0.99 | 0.00 | 0.00 | 0.01% | 0.01% | 0.30% | 0.04% | 0.02% | 0.10% |
| H | 0.98 | 0.16 | 0.16 | 0.37% | 0.18% | 0.30% | 0.13% | 0.04% | 0.10% |
| I | 0.98 | 0.80 | 0.79 | 1.78% | 0.89% | 0.30% | 0.72% | 0.07% | 0.10% |
| J | 0.98 | 0.82 | 0.80 | 1.82% | 0.90% | 0.29% | 0.76% | 0.13% | 0.10% |

It should be noted that the member securities of TW-3 are the same as TW-1 and TW-2, but their weights are very different. This selection criterion, using the methodology described herein, may give investors an opportunity to own a high capacity TWI that is also highly concentrated on multiple risk factors.

It should generally be noted with respect to the various indexes and/or weighting methodologies discussed herein that rounding weights and/or positions might prove useful. In the present example, positions in the exemplary indexes are rounded to the nearest tenth of a percent. Alternate embodiments optionally round to the nearest hundredth of a percent or whole percentage point, or any other convenient point.

Digital Processing Device

In some embodiments, the systems, software, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Non-Transitory Computer Readable Storage Medium

In some embodiments, the systems, software, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the systems, software, and methods disclosed herein include at least one computer program, or use of the same. A computer program includes a sequence of instructions, executable in the digital processing device's CPU, written to perform a specified task. In light of the disclosure provided herein, those of skill in the art will recognize that a computer program may be written in various versions of various languages. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity Mobile Application In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

The systems, software, and methods disclosed herein include, in various embodiments, software, server, and database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

EXAMPLES

The following illustrative examples are representative of embodiments of the methods, devices, and systems for transformation-based index construction described herein and are not meant to be limiting in any way.

Example 1

TWI Characteristics

A percentile transformation is applied to a notional risk factor metric for a set of 1000 securities.

Table 4 shows a sampling of percentiles at either end of the 1000-member index with weighting percentages calculated by dividing a given percentile by the sum of the percentiles for each index constituent with respect to a notional metric.

TABLE 4

Percentiles of a 1000 member index of marketable securities; weighting percentage determined by dividing percentile by aggregate of all index member percentiles

| Percentiles, Top 10 | Weighting Percentage, Top 10 | Percentiles, Bottom 10 | Weighting Percentage, Bottom 10 |
|---|---|---|---|
| 1.0000 | 0.2003% | 0.0090 | 0.0018% |
| 0.9980 | 0.1999% | 0.0080 | 0.0016% |
| 0.9970 | 0.1997% | 0.0070 | 0.0014% |
| 0.9960 | 0.1995% | 0.0060 | 0.0012% |
| 0.9950 | 0.1993% | 0.0050 | 0.0010% |
| 0.9940 | 0.1991% | 0.0040 | 0.0008% |
| 0.9930 | 0.1989% | 0.0030 | 0.0006% |
| 0.9920 | 0.1987% | 0.0020 | 0.0004% |
| 0.9910 | 0.1985% | 0.0010 | 0.0002% |
| 0.9900 | 0.1983% | 0.0000 | 0.0000% |

Figure 3:
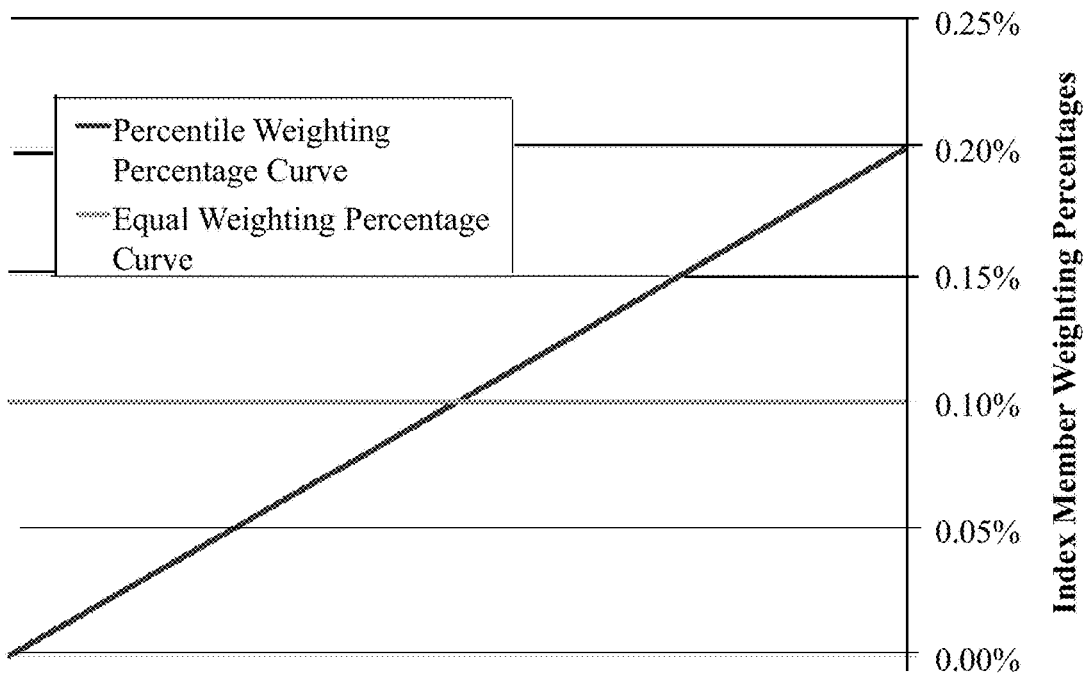
FIG. 3 shows non-limiting, exemplary weighting percentage curves of the percentile and equal weighted indexes of Example 1.

FIG. 3 depicts the graphical appearance of a percentile-based weighting percentage curve compared with a weighting percentage curve of an equal weight index of 1000 constituents. In the transformed index, weighting percentages vary between 0.20% to 0.00%. The equal weight index allocates 0.10% to all constituents. This suggests how a Transformation Weighted index may accentuate one or more factors on which it is based.

To a percentile, one may optionally administer an additional transformation, such as a power, to change the shape of the weighting percentage curve and as well as the relative concentration of one or more risk factors on which it is based. Table 5 uses decile analysis of a 1000-member index to show how the process of transforming percentiles with powers affects the distribution of index member weighting percentages. Powers greater than one result in higher weighting percentage concentrations. This suggests how a Transformation Weighted index may further accentuate one or more factors on which it is based.

TABLE 5

Decile concentrations resulting from the application of various exponents to a percentile for a notional 1000-member index.

| Decile | Exponent of 2 Applied to Percentiles | Exponent of 4 Applied to Percentiles | Exponent of 6 Applied to Percentiles | Exponent of 8 Applied to Percentiles | Exponent of 10 Applied to Percentiles |
|---|---|---|---|---|---|
| One | 27.1267% | 40.9961% | 52.2298% | 61.3276% | 68.6950% |
| Two | 21.7081% | 26.2772% | 26.8376% | 25.2834% | 22.7411% |
| Three | 16.9048% | 15.9564% | 12.7242% | 9.3713% | 6.5974% |
| Four | 12.6955% | 9.0171% | 5.4211% | 3.0156% | 1.6062% |
| Five | 9.0942% | 4.6411% | 2.0107% | 0.8082% | 0.3119% |
| Six | 6.0927% | 2.0943% | 0.6142% | 0.1679% | 0.0442% |
| Seven | 3.6919% | 0.7770% | 0.1408% | 0.0240% | 0.0040% |
| Eight | 1.8926% | 0.2092% | 0.0203% | 0.0019% | 0.0002% |
| Nine | 0.6952% | 0.0306% | 0.0012% | 0.0000% | 0.0000% |
| Ten | 0.0984% | 0.0010% | 0.0000% | 0.0000% | 0.0000% |

Figure 4:
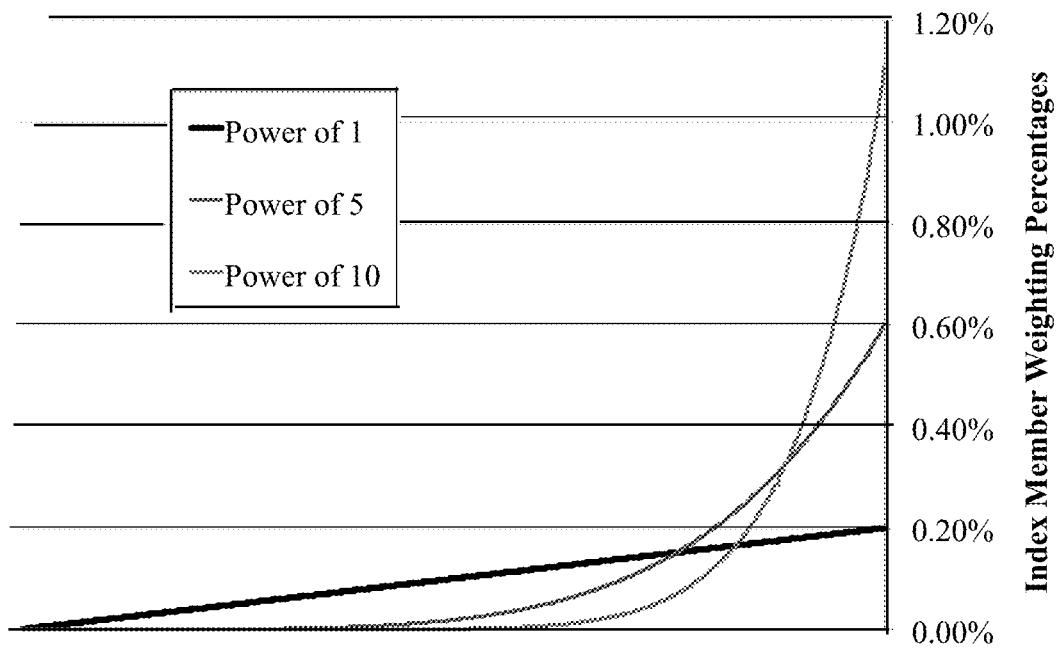
FIG. 4 shows non-limiting, exemplary weighting percentage curves from power transforming percentiles as discussed in Example 1.

FIG. 4 displays weighting percentage curves that result from the application of different powers to the percentiles, suggesting how a Transformation Weighted index may be used to customize the emphasis of one or more risk factors on which it may be based.

Figure 5:
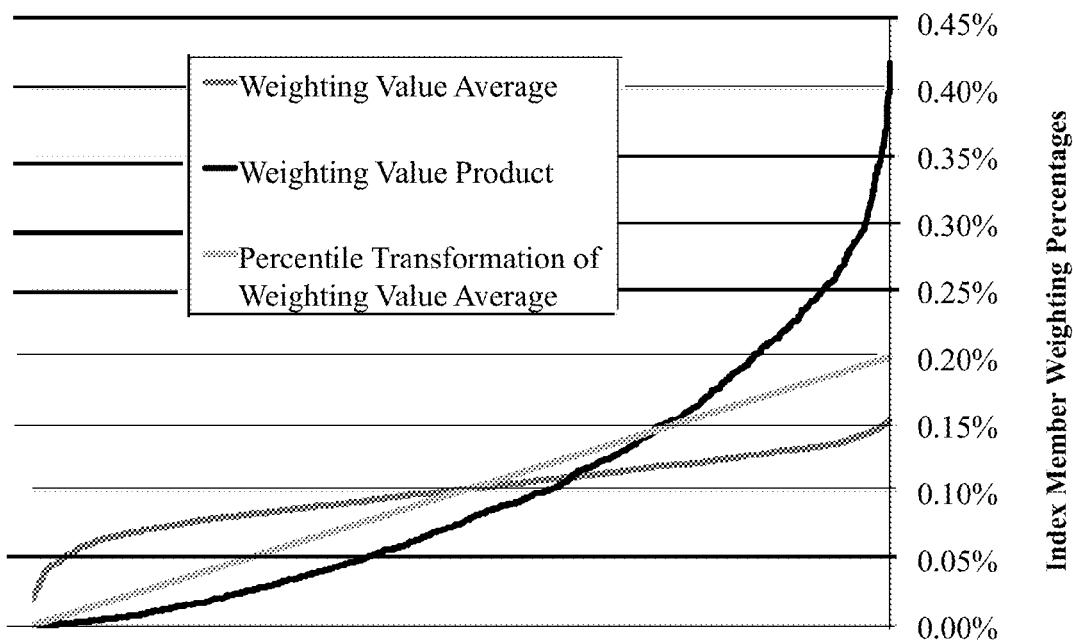
FIG. 5 shows non-limiting, exemplary weighting percentage curves from various methods of combining percentiles of multiple risk factor metrics as discussed in Example 1.

Subsequent to the preceding two-step transformations for multiple risk factors of a security, one optionally combines the transformed values into a single index. Two ways to do so are averaging and multiplying. In this non-limiting example, the output values may again undergo a percentile transformation before being transformed further with an exponent. A decision to average, to multiply, or to perform subsequent transformations has a significant impact on the weighting percentage curve that results, as shown in FIG. 5 (here, the straight-line weighting percentage curve results from a percentile applied to the average, similar to FIG. 3, but in this case is based on several factors, demonstrating the ability to combine different data types into a standardized format).

Whereas conventional indexes are structurally rigid, transformations make weighting percentage curves malleable and make it possible to bend them to suit different objectives. The choice of transformations and their combinations is without limit.

Example 2

TWI Construction

In this example, three TWIs are derived from a 1000-stock universe selected by highest market capitalization.

A first Transformation Weighted Index, TW-1, may directly access three risk factors: low volatility, value, and momentum. TW-1 may also provide inherent exposure to the size and market factors. For each stock, percentiles of the following metrics may be multiplied: Shareholder Equity for the most recent quarter (a value risk factor), four-quarter Share Price Change (a momentum risk factor), and a twelve-month exponentially weighted average Beta (a volatility risk factor; here the percentile may be subtracted from 1.00 to emphasize low volatility stocks). To this product, a subsequent percentile-power transformation may be applied, using an exponent of two, to produce a weighting value. An investor may consider most relevant benchmark to be an equal weighted index because of TW-1's relatively similar investment capacity and constituent weighting percentages.

Figure 6:
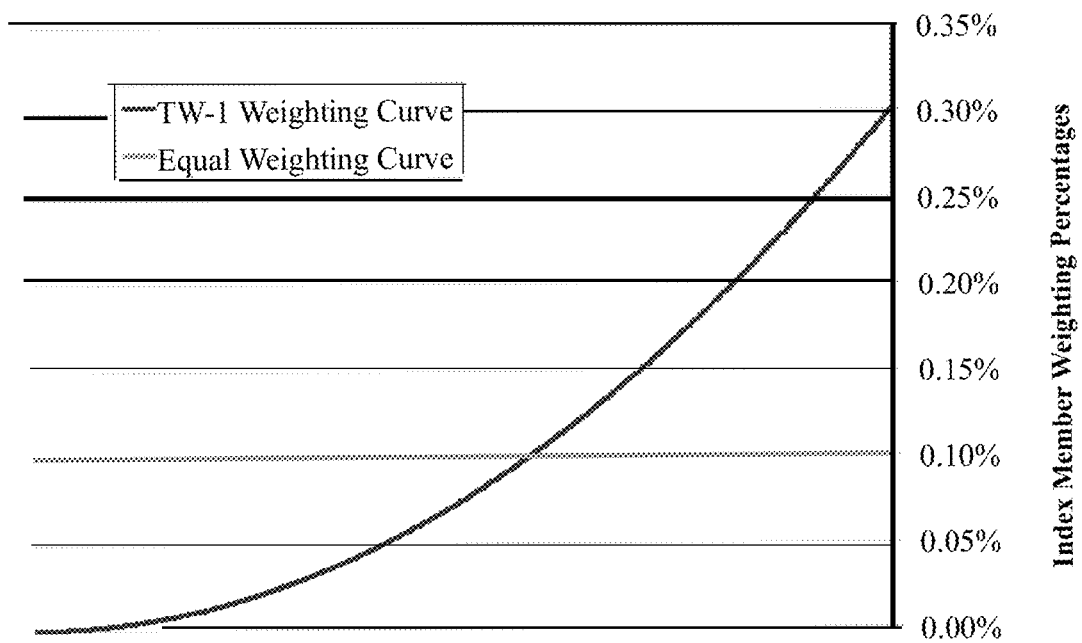
FIG. 6 shows non-limiting, exemplary comparison of the weighting percentage curves of TW-1 and an equal weight index as discussed in Example 2.

FIG. 6 shows weighting percentage curves for TW-1 and an equal weighted index.

A second Transformation Weighted Index, TW-2, may be based on economic size. TW-2's construction may follow the same percentile-power process previously described. First, a percentile transformation of trailing four-quarter Total Revenue may be performed. Then, the percentile of each stock may be raised by a power of 10 to create an index with features that resemble a non-transformed fundamentally weighted index based on the same risk factor metric and a capitalization weighted index, which may be considered benchmarks for TW-2.

Figure 7:
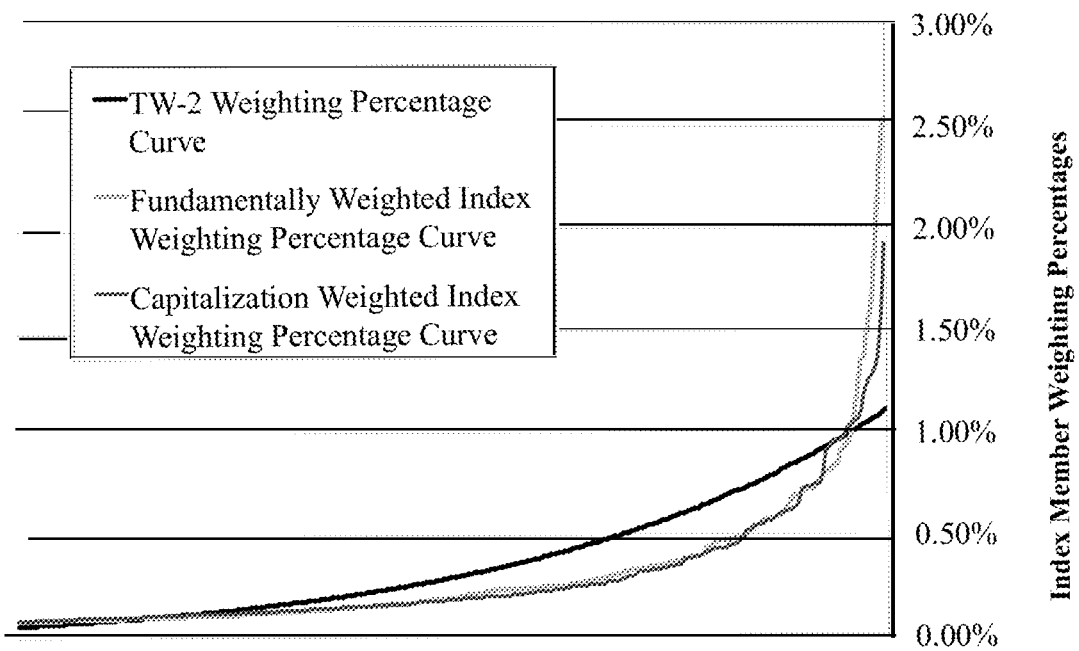
FIG. 7 shows non-limiting, exemplary comparison of the weighting percentage curves of TW-2, a fundamentally weighted index, and a capitalization weighted index as discussed in Example 2.

FIG. 7 provides a weighting percentage curve comparison of TW-2 and the two benchmarks mentioned previously. The comparison is limited to the top 250 holdings to highlight how TW-2 underweights about one dozen of its largest holdings, relative to its benchmarks, while weighting the remainder of the top two deciles more heavily.

Figure 8:
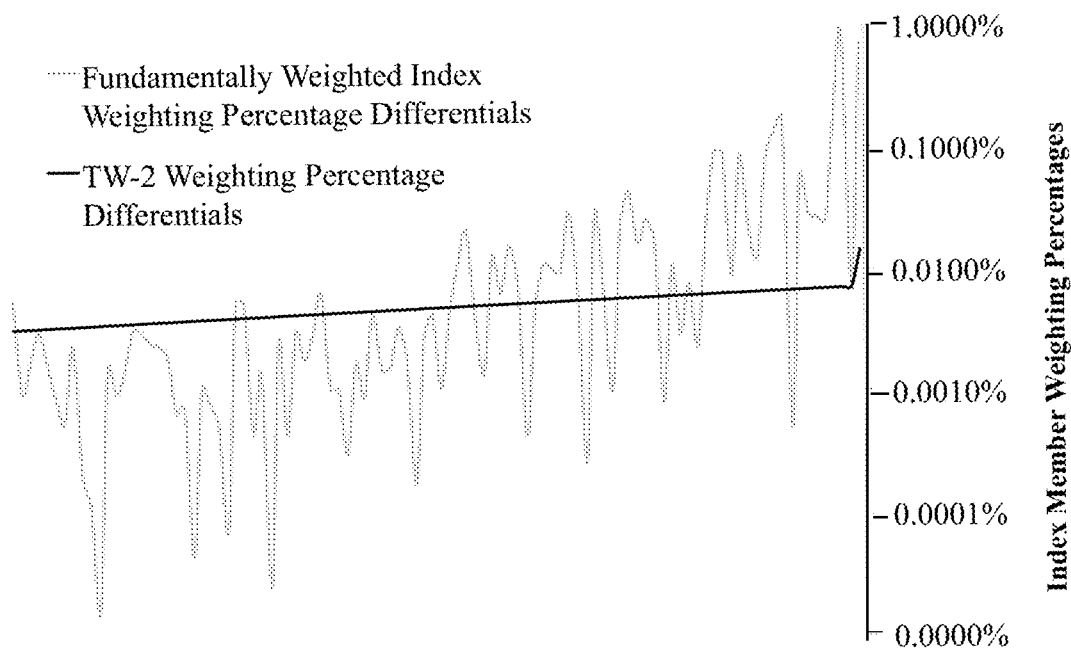
FIG. 8 shows non-limiting, exemplary comparison of constituent-by-constituent weight differentials for TW-2 and a non-transformed fundamentally weighted index as discussed in Example 2.

FIG. 8 shows another feature of TW-2: the gradual grade of its weighting percentage curve, which may be described as the difference in weighting percentages between adjacent index members.

A third Transformation Weighted Index, TW-3, may be a composite of TW-1 and TW-2 created by multiplying the weighting values used to set the weighting percentages of TW-1 and TW-2. This product may be used as the weighting value for TW-3. When produced through this process, TW-3 may be regarded as high investment capacity and exposure to multiple investment risk factors.

Figure 9:
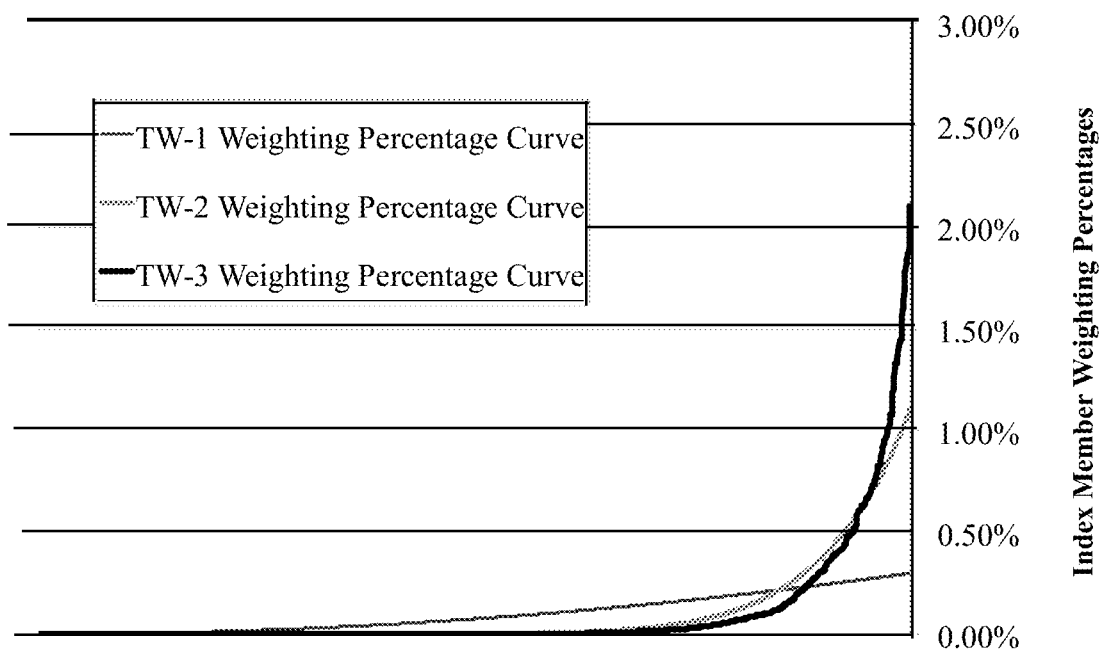
FIG. 9 shows non-limiting, exemplary comparison of the weighting percentage curves of TW-1, TW-2, and TW-3 as discussed in Example 2.

FIG. 9 compares the weighting percentage curves of TW-1, TW-2, and TW-3.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. Non-transitory computer-readable storage media encoded with a computer program including instructions executable by a processor to create an application comprising:
   a. instructions for selecting a universe of securities or receiving input indicating a universe of securities;
   b. instructions for selecting one or more security risk factor metrics or receiving input indicating one or more security risk factor metrics;

c. instructions for creating an index, the index comprising a plurality of member securities selected from the universe of securities, each member security having a weight in the index;

provided that selection of member securities and the weight in the index of each member security is determined by applying one or more data transformations to the one or more security risk factor metrics for each security in the universe of securities, to increase risk factor exposure, according to the following formula:

$$w=[f(m)_1 * f(m)_2 \ldots f(m)_q]_i / \Sigma[f(m)_1 * f(m)_2 \ldots f(m)_q]_n$$

wherein i is a given security,
wherein w is the weight of a security in the index,
wherein m is a security risk factor metric,
wherein n is the number of member securities in an index,
wherein $f(m)_1$ is a transformed weighting value of a first security risk factor metric,
wherein $f(m)_2$ is a transformed weighting value of a second security risk factor metric,
wherein $f(m)_q$ is a transformed weighting value of an ultimate security risk factor metric,
and wherein * is a mathematical operation to be performed on transformed security risk factor metrics; and d. instructions for maintaining the index at periodic time intervals, wherein maintaining comprises: adjusting weightings of index members based upon dividing said one or more data transformations by the sum of said one or more data transformations for all said index members;

provided that at least one security risk factor metric is based on: total assets, total liabilities, total revenues, security pricing, or manipulations thereof;

provided that the one or more data transformations are selected from: binary transformation, inverse transformation, log transformation, percentile transformation, power transformation, and root transformation, or a combination thereof.

2. The storage media of claim 1, wherein the one or more security risk factor metrics include a non-numeric datum for which a value or score has been substituted.

3. The storage media of claim 1, wherein the weight of a security in the index is determined by applying one or more subsequent data transformations to one or more of the transformed weighting values.

4. The storage media of claim 1, wherein the mathematical operation to be performed on transformed security risk factor metrics is selected from: multiplication, division, addition, subtraction, an average, weighted average, or a median.

5. The storage media of claim 1, wherein the application further comprises instructions for updating the values of the one or more security risk factor metrics for each security in the universe of securities.

6. The storage media of claim 1, wherein the application further comprises instructions for adding or removing securities from the index by re-applying the one or more data transformations to the updated one or more security risk factor metrics for each security in the universe of securities.

7. The storage media of claim 5, wherein the application further comprises instructions for updating the weight of securities in the index by re-applying the one or more data transformations to the updated one or more security risk factor metrics for each security in the universe of securities.

8. A computer-implemented method comprising the steps of:

a. creating an index of securities, by a processor, by selecting securities from universe of securities to be index members based upon one or more data transformations of one or more security risk factor metrics regarding entities or securities associated with the entities;

b. weighting each index member, by a processor, based upon dividing said one or more data transformations by the sum of said one or more data transformation for all said index members; and c. maintaining the index at periodic time intervals by a processor, wherein maintaining comprises: adjusting weightings of index members based upon dividing said one or more data transformations by the sum of said one or more data transformation for said index members;

provided that selection of index member securities and the weight in the index of each member security is directly determined according to the following formula:

$$w=[f(m)_1 * f(m)_2 \ldots f(m)_q]_i / \Sigma[f(m)_1 * f(m)_2 \ldots f(m)_q]_n$$

wherein i is a given security,
wherein w is the weight of a security in the index,
wherein m is a security risk factor metric,
wherein n is the number of member securities in an index,
wherein $f(m)_1$ is a transformed weighting value of a first security risk factor metric,
wherein $f(m)_2$ is a transformed weighting value of a second security risk factor metric,
wherein $f(m)_q$ is a transformed weighting value of an ultimate security risk factor metric, and wherein * is a mathematical operation to be performed on transformed security risk factor metrics;

provided that at least one security risk factor metric is based on: total assets, total liabilities, total revenues, security pricing, or manipulations thereof;

provided that the one or more data transformations are selected from: binary transformation, inverse transformation, log transformation, percentile transformation, power transformation, and root transformation, or a combination thereof;

provided that selection of index member securities and the weight in the index of each member security increases risk factor exposure.

9. The method of claim 8, wherein the one or more security risk factor metrics are for the most recent period, an average over any time period, a change over any time period, or the variance over any time period.

10. The method of claim 8, further comprising the step of maintaining the index at periodic time intervals, by a processor, wherein maintaining comprises: adding and removing securities index members based upon one or more data transformations of one or more security risk factor metrics regarding entities or securities associated with the entities.

11. The method of claim 8, wherein the one or more security risk factor metrics include a non-numeric datum for which a value or score has been substituted.

12. A computer-implemented system comprising:

a. a digital processing devices comprising a processor and memory configured to perform executable instructions;

b. a computer program including instructions executable by the digital processing device to create an application comprising:

i. instructions for creating an index of securities by selecting securities from a universe of securities to be index members based upon one or more data transformations of one or more security risk factor metrics regarding entities or securities associated with the entities; and ii. instructions for weighting each index member based upon dividing said one or more data transformations by the sum of said one or more data transformations for all said index members; and iii. instructions for maintaining the index at periodic time intervals, by a processor, wherein maintaining comprises: adjusting weightings of index members based upon dividing said one or more data transformations by the sum of said one or more data transformation for all said index members;

provided that selection of index member securities and the weight in the index of each member security is directly determined according to the following formula:

$$w=[f(m)_1 * f(m)_2 \ldots f(m)_q]_i / \Sigma[f(m)_1 * f(m)_2 \ldots f(m)_q]_n$$

wherein i is a given security,
wherein w is the weight of a security in the index,
wherein m is a security risk factor metric,
wherein n is the number of member securities in an index,
wherein $f(m)_1$ is a transformed weighting value of a first security risk factor metric,
wherein $f(m)_2$ is a transformed weighting value of a second security risk factor metric,
wherein $f(m)_q$ is a transformed weighting value of an ultimate security risk factor metric, and wherein * is a mathematical operation to be performed on transformed security risk factor metrics;

provided that at least one security risk factor metric is based on: total assets, total liabilities, total revenues, security pricing, or manipulations thereof;

provided that the one or more data transformations are selected from: binary transformation, inverse transformation, log transformation, percentile transformation, power transformation, and root transformation, or a combination thereof;

provided that selection of index member securities and the weight in the index of each member security increases risk factor exposure.

13. The system of claim 12, wherein the application further comprises instructions for maintaining the index at periodic time intervals, wherein maintaining comprises: adding and removing securities index members based upon one or more data transformations of one or more security risk factor metrics regarding entities or securities associated with the entities.

14. The system of claim 12, wherein the one or more security risk factor metrics include a non-numeric datum for which a value or score has been substituted.

* * * * *